(12) United States Patent
Forsythe

(10) Patent No.: US 8,577,788 B1
(45) Date of Patent: Nov. 5, 2013

(54) AUTOMATIC STRATEGY GROUPING FOR A TRADING SYSTEM

(71) Applicant: OptionMonster Holdings, Inc., Chicago, IL (US)

(72) Inventor: Aric Forsythe, Chicago, IL (US)

(73) Assignee: tradeMONSTER Group, Inc., Chicago, IL (US)

( * ) Notice: Subject to any disclaimer, the term of this patent is extended or adjusted under 35 U.S.C. 154(b) by 0 days.

(21) Appl. No.: 13/674,691

(22) Filed: Nov. 12, 2012

Related U.S. Application Data

(63) Continuation of application No. 12/586,279, filed on Sep. 18, 2009, now Pat. No. 8,332,305.

(60) Provisional application No. 61/192,877, filed on Sep. 22, 2008.

(51) Int. Cl.
G06Q 40/00 (2012.01)

(52) U.S. Cl.
USPC .............................. 705/37; 705/30

(58) Field of Classification Search
USPC .................................... 705/10–44
See application file for complete search history.

(56) References Cited

U.S. PATENT DOCUMENTS

| | | | |
|---|---|---|---|
| 5,220,500 A * | 6/1993 | Baird et al. ................. | 705/36 R |
| 6,601,044 B1 | 7/2003 | Wallman | |
| 6,983,257 B2 | 1/2006 | Gatto | |
| 7,366,692 B2 | 4/2008 | Alcaly et al. | |
| 7,539,637 B2 | 5/2009 | Gatto | |
| 7,546,264 B2 | 6/2009 | Charnley, Jr. | |
| 7,685,046 B2 * | 3/2010 | Wallman ..................... | 705/36 R |
| 7,734,526 B2 | 6/2010 | Howard et al. | |
| 7,747,508 B1 | 6/2010 | Silverman | |
| 7,856,396 B2 | 12/2010 | Chiulli et al. | |
| 7,865,423 B2 | 1/2011 | Hughes et al. | |
| 8,024,246 B2 * | 9/2011 | Alderman et al. .......... | 705/36 R |
| 2002/0059126 A1 * | 5/2002 | Ricciardi ....................... | 705/36 |
| 2004/0024677 A1 | 2/2004 | Wallman | |
| 2006/0116944 A1 | 6/2006 | Perg et al. | |
| 2007/0083455 A1 | 4/2007 | Bove et al. | |
| 2007/0150396 A1 * | 6/2007 | Rossen et al. ............... | 705/36 R |
| 2007/0150397 A1 | 6/2007 | Rossen et al. | |
| 2008/0234716 A1 | 9/2008 | Kiester | |
| 2009/0070274 A1 | 3/2009 | Bukowski et al. | |
| 2009/0276372 A1 | 11/2009 | Wallman | |
| 2010/0023459 A1 | 1/2010 | Sundby | |
| 2010/0216545 A1 * | 8/2010 | Lange et al. .................. | 463/26 |
| 2011/0307416 A1 * | 12/2011 | Alderman et al. .......... | 705/36 R |
| 2012/0084194 A1 | 4/2012 | Farrell et al. | |

OTHER PUBLICATIONS

Kennedy et al., "Dynamic Hedging Under Jump Diffusion with Transaction Costs," Operations Research, vol. 57, No. 3, May-Jun. 2009, pp. 541-559, ISSN 0030-364x, EISSN 1526-5463, 09, 5703, 0541.

* cited by examiner

Primary Examiner — Frantzy Poinvil
(74) Attorney, Agent, or Firm — Lempia Summerfield Katz LLC

(57) ABSTRACT

A system for trading comprises a processor and a memory. The processor is configured to: receive an indication to automatically group a set of investment instruments; determine a set of possible strategies from the set of investment instruments; determine a set of groupings of strategies from the set of possible strategies; and determine one or more selected groupings from the set of groupings of strategies based at least in part on a selection criteria. The memory is coupled to the processor and configured to provide the processor instructions.

21 Claims, 16 Drawing Sheets

AUTOMATIC STRATEGY GROUPING FOR A TRADING SYSTEM

REFERENCE TO RELATED APPLICATIONS

This application is a continuation application of U.S. patent application Ser. No. 12/586,279, filed Sep. 18, 2009, now U.S. Pat. No. 8,332,305, the entire disclosure of which are hereby incorporated by reference in its entirety. This application claims the benefit of the filing date under 35 U.S.C. §119(e) of U.S. Provisional Application Ser. No. 61/192,877 filed Sep. 22, 2008, which is hereby incorporated by reference in its entirety.

BACKGROUND

As a user accumulates various instruments under the same underlying, it can get difficult to understand the aggregate position because of the complex interrelationships of stock and various option contracts. Also, given this state of complexity, it can be difficult to formulate trades—for example, if the user wanted to trade multiple legs at a time the user would have to figure out standard combinations of those legs by hand. In addition, as the user makes trades the ability to formulate and track spread holdings can be difficult because the make-up of the possible component strategies can change.

BRIEF DESCRIPTION OF THE DRAWINGS

Various embodiments of the invention are disclosed in the following detailed description and the accompanying drawings.

FIG. 7 is a diagram illustrating an embodiment of a window providing metrics and data available at the strategy level for the strategies created by Automated Strategy Grouping.

DETAILED DESCRIPTION OF THE DRAWINGS AND PRESENTLY PREFERRED EMBODIMENTS

Figure 1:
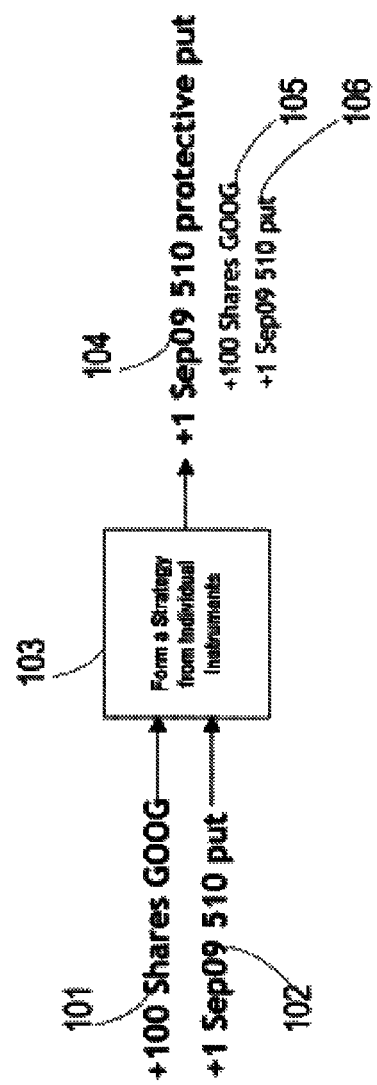
FIG. 1 is a flow diagram illustrating an embodiment of the processes of forming a strategy from individual instruments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatic strategy grouping for a trading system is disclosed. An indication is received to automatically group a set of investment instruments. A set of possible strategies is determined from the set of investment instruments. A set of groupings of strategies is determined from the set of possible strategies. One or more selected groupings is determined from the set of groupings of strategies based at least in part on a selection criteria.

In some embodiments, a trading system automatically assigns a grouping of standard strategies to a set of individual instruments related to the same underlying instrument held by a user. In various embodiments, the investment instrument comprises one or more of the following: an option, contract on an underlying investment instrument, a stock, a mutual fund, an exchange traded fund, an index, a currency, an asset, or any other appropriate investment instrument. In some embodiments, a standard strategy comprises a position in a spread or an individual instrument. In some embodiments, a standard strategy comprises a combination of being long or short with one or more of the following: a call, a put and/or the underlying instrument (e.g., a stock, index or fund on which the call or put option is associated with).

As the option industry has evolved over the last several decades, some strategies have become so popular they are "standard" to the industry in terms of component instruments that make up the strategy. In various embodiments, an automated strategy grouping system triggers whenever the trading system recognizes that an order has filled in the market. Upon triggering, an algorithm and a defined (but updateable) set of standard strategies is used to find the range of possible strategy groupings (e.g., a set of possible strategies) that can be created by grouping into standard strategies the held instruments related to the same underlying (e.g., investment instrument) as the filled order. From the range of possible strategy groupings, an automated strategy grouping system selects the grouping the user is most likely to want, using a tie-breaker system if necessary. Automated Strategy Grouping then updates a user interface automatically so that the user may monitor and trade the strategies in the grouping as if they were single instruments. In some embodiments, the automated strategy grouping system is invoked interactively by a user who can request at any time to see the range of possible groupings for the positions held for any underlying and choose from the range a grouping to apply to the held positions.

In some embodiments, an automated grouping system offers several major advantages to a user of a trading system. For example, an automated grouping system saves the user time that would be spent accessing, monitoring and operating on instruments individually which can be better managed as groups of strategies. With automated grouping of strategies, operations can easily be performed directly on the strategies where the operations can comprise one or more of the following: receiving or requesting a quote on a selected strategy in the grouping, trading a selected strategy in the grouping, viewing the risk metrics on a selected strategy in the grouping. Another advantage of the automated grouping system is that it helps the user manage larger and more complex portfolios since the possible permutations of strategies that can be created from held positions can be large and unintuitive when a human eye (e.g., the user) examines a list of holdings.

In some embodiments, automatic strategy grouping can be executed from an Action Menu by clicking Grouping. The Alternative Grouping dialog will then pop up. In this dialog, the user may generate and select an alternate grouping of strategies. In some embodiments, automatic strategy grouping is also called without user intervention to return the strategy grouping the user is most likely to want automatically.

FIG. 1 is a flow diagram illustrating an embodiment of the process of forming a strategy from individual instruments. In the example shown, position 101 comprises an instrument, where the instrument is Google stock (symbol GOOG) and where position 101 is long 100 shares of Google stock. Position 102 comprises a long 1 September, 2009 put option with a strike price of 510. Process 103 forms a single strategy from held position 101 (the long stock position) and position 102 (the long put option position). Strategy 104 indicates the result of forming a strategy, in this case the strategy formed includes leg 105 associated with position 101 and leg 106 associated with position 102 and comprises a long "protective put" position with an expiration of September 2009 and a strike price of 510.

Figure 2:
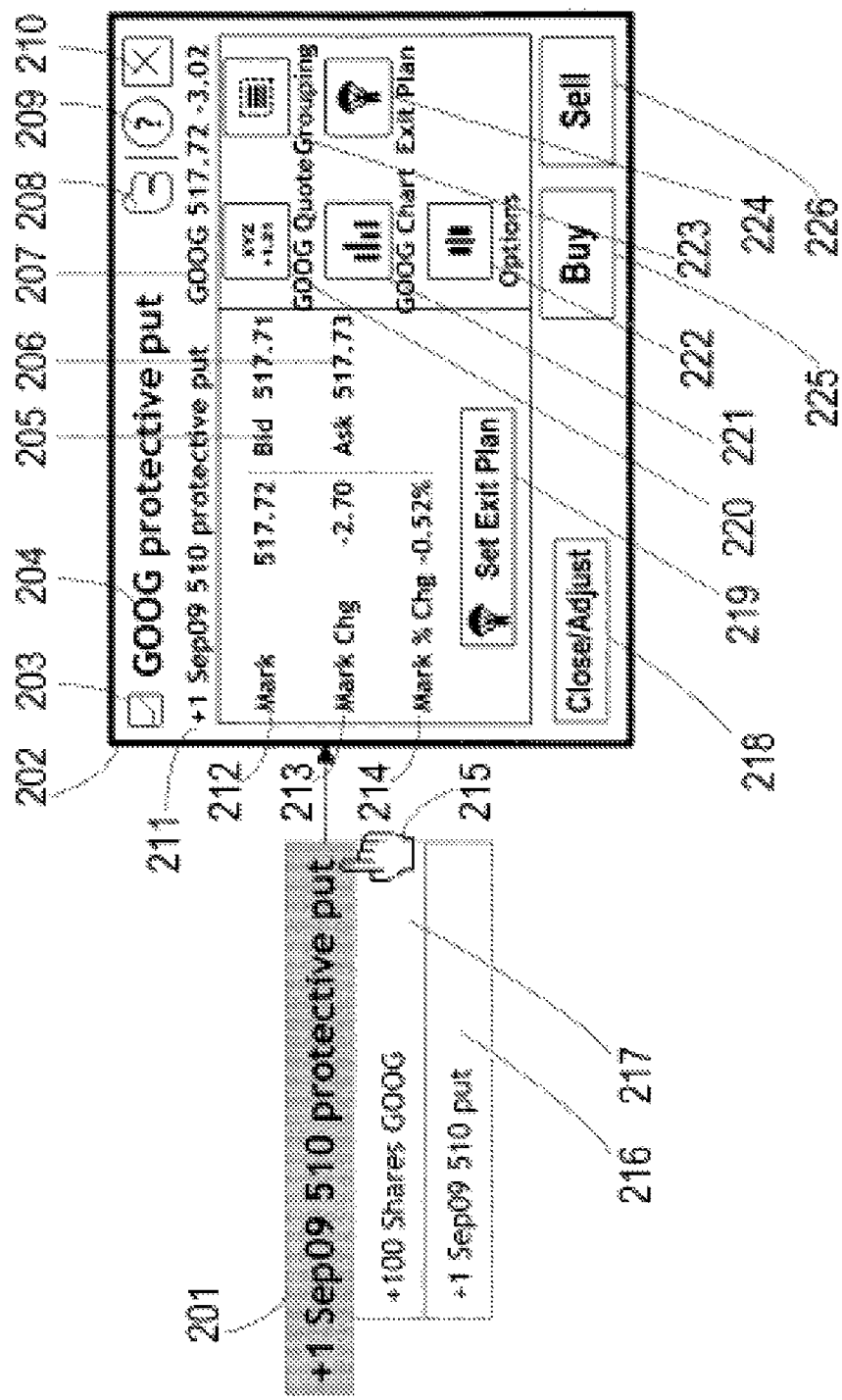
FIG. 2 is a diagram illustrating an embodiment of an Action Menu.

FIG. 2 is a diagram illustrating an embodiment of an Action Menu. In some embodiments, the action menu is invoked from display indicating a strategy to provide actions for operating on the strategy. In the example shown, strategy 201 indicates a strategy in a line of a table that when clicked on, invokes Action Menu 202. Icon 203 comprises an icon indicative of a risk profile and a profit and loss indicator for strategy 201. Action Menu 202 includes name of strategy 204, real-time Bid price 205 in the market for strategy 201, real-time Ask price 206 in the market for strategy 201, and mark price 207 of Google stock (symbol GOOG) and how much it is up or down on the day. Action Menu 202 also includes Twitter button 208, which allows a user to share strategy 201 and comments about it on the social networking site Twitter; help button 209, which allows a user to access help for Action Menu 202; and close button 210, which enables a user to close the window.

Action Menu 202 includes position description 211, which indicates a description of the position, where "+1" indicates long 1 unit of the strategy, "Sep09" indicates the expiration of the strategy, "510" indicates the strike price of the strategy and "protective put" indicates the type of strategy. Action Menu 202 also includes real-time mark price 212 of strategy 201; day's change in the mark price 213 of strategy 201, day's percentage change in the mark price 214 of strategy 201; and user's cursor 215, which is positioned to click strategy 201 such that the result of that click is the display of Action Menu 202.

Leg 216 comprises the put instrument contained in strategy 201, and leg 217 comprises the stock instrument contained in strategy 201. Button 218 enables a user to invoke a trade to close the strategy or adjust strategy 201 where adjusting strategy 201 comprises executing a trade that changes the characteristics such as strike price or expiration of strategy 201. Button 219 enables a user to create an Exit Plan which comprises a profit target exit point and/or a loss minimization exit point for the strategy. Button 220 enables a user to get quote information on GOOG stock. Button 221 enables a user to get a chart of GOOG stock. Button 222 enables a user to get an option chain of GOOG options. Button 223 enables a user to invoke an automated strategy grouping system to come up with a list of alternative groupings for instruments held for the GOOG underlying (the underlying in this example being Google stock) and select one of the groupings from the list that is generated. Button 224 enables a user to view an Exit Plan for the strategy. Button 225 enables a user to Buy strategy 201. Button 226 enables a user to Sell strategy 201.

Figure 3:
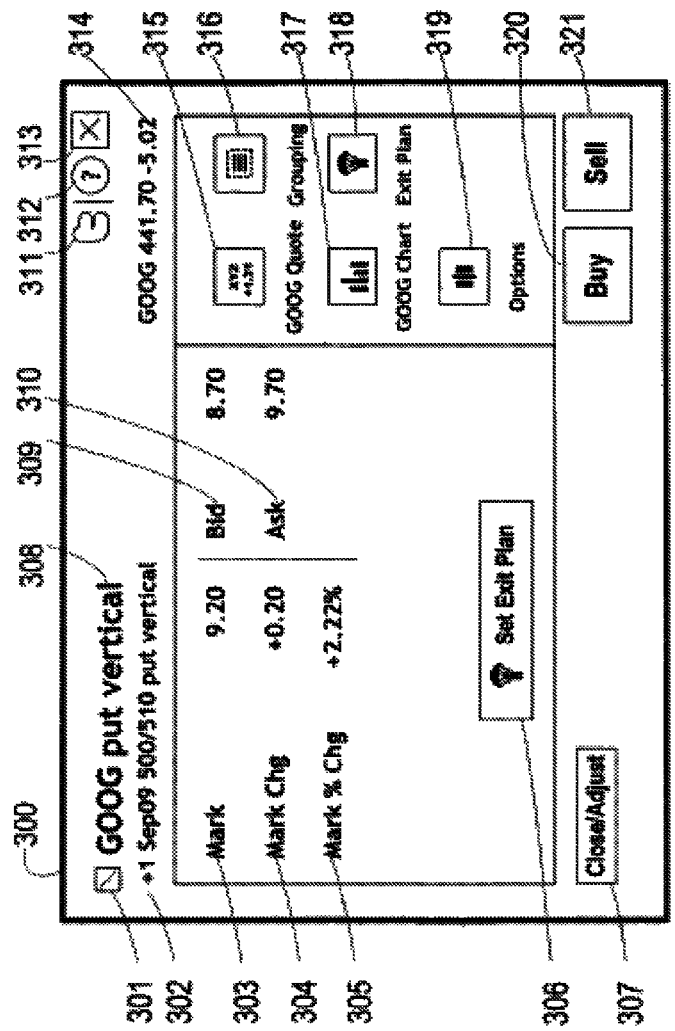
FIG. 3 is a diagram illustrating an embodiment of an Action Menu which can launch the Alternative Grouping window.

FIG. 3 is a diagram illustrating an embodiment of an Action Menu. In some embodiments, the action menu of FIG. 3 is used by a user to launch an automated strategy grouping system manually. In the example shown, Action Menu 300 shows a put vertical strategy for GOOG underlying. This strategy is a two legged spread; that is, it is comprised of two individual option contracts. Icon 301 comprises an icon that is indicative of a risk profile and profit and loss indicator for the strategy. Description of the position 302 includes a "+1" indicating long 1 unit of the strategy, "Sep09" indicating the expiration of the strategy, "500/510" indicating the two strike prices of the strategy and "put vertical" indicating the type of strategy. Action Menu 300 includes real-time mark price of the strategy 303, day's change in the mark price of the strategy 304, and day's percentage change in the mark price of the strategy 305.

Action Menu 300 also includes button 306 with which a user can create an Exit Plan for the strategy, button 307 with which a user can invoke a trade to close the strategy or adjust the strategy where adjusting the strategy is executing a trade that changes the characteristics such as strike price or expiration of the strategy, name of the strategy 308, real-time Bid price in the market for the strategy 309, and real-time Ask price in the market for the strategy 310.

Action Menu 300 includes link 311 which enables a user to share this strategy and comments about it on the social networking site Twitter; button 312 which enables a user to access help for Action Menu 300; button 313 which enables a user to close the window; mark price of Google stock 314 (symbol GOOG) and how much it is up or down on the day;

button 315 with which a user can get quote information on GOOG stock; button 316 with which a user can invoke an automated strategy grouping system to come up with a list of alternative groupings for instruments held for the GOOG underlying (the underlying in this example being GOOG stock) and select one of the groupings from the list that is generated; button 317 with which the user can get a chart of GOOG stock; button 318 with which the user can create an Exit Plan for the strategy; button 319 with which the user can get an option chain of GOOG options; button 320 from which the user can Buy the strategy; and button 321 with which the user can Sell the strategy.

Figure 4:
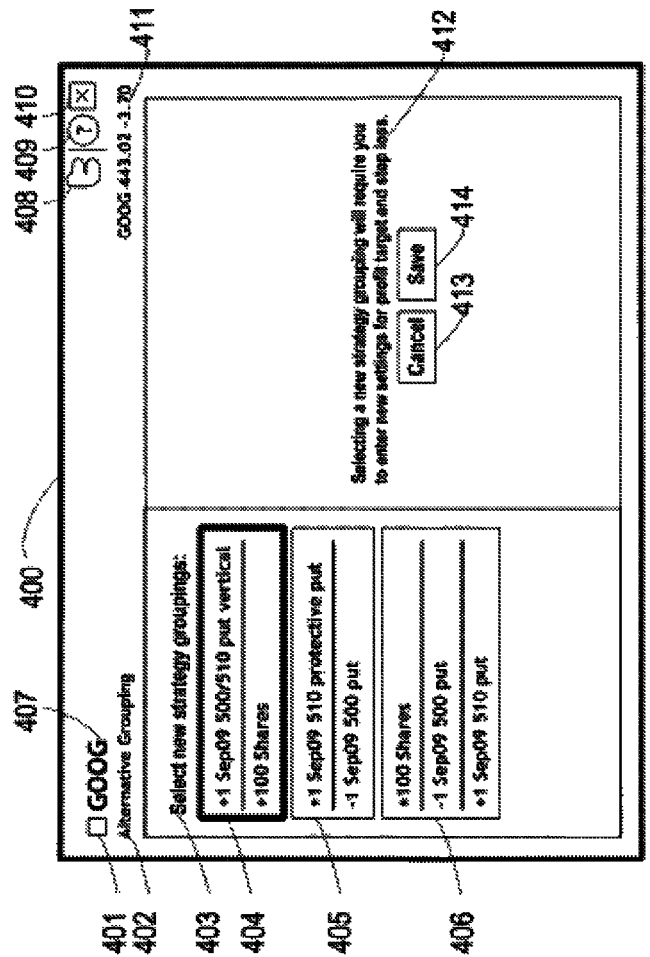
FIG. 4 is a diagram illustrating an embodiment of window displaying Alternative Groupings.

FIG. 4 is a diagram illustrating an embodiment of a window displaying alternative groupings. In the example shown, window 400 is shown after a grouping button has been clicked on an Action Menu (e.g., 223 of FIG. 2 or 316 of FIG. 3). Window 400 shows grouping 404, grouping 405, and grouping 406. Grouping 404 comprises a highlighted group (e.g., highlighted because the grouping was selected) with two put contracts in a vertical strategy along with 100 shares as a second strategy. Grouping 405 comprises a group with a long put with shares to form a protective put strategy, and a short put as a strategy comprised of just one instrument. Grouping 406 comprises a group with each individual instrument. A user can select the preferred grouping (e.g., by clicking). Icon 401 is an icon that indicates using a color gradient whether the GOOG underlying is up or down on the day (e.g., dark red for down substantially, light red for down, gray for no change, light green for up, and dark green for up substantially). Window 400 includes title 402 indicating the title "Alternative Grouping." Instruction 403 comprises text to prompt the user to select a grouping from the available choices. Symbol 407 comprises a symbol for the underlying investment instrument, in this case the Google stock symbol GOOG. Button 408 enables a user to share information or comments about these groupings on the social networking site Twitter. Button 409 enables a user to access help for window 400. Button 410 enables a user to close window 400.

Window 400 includes mark price of Google stock 411 (symbol GOOG) and how much it is up or down on the day and warning statement 412 alerting a user if a new strategy grouping is selected that Exit Plans will need to be re-entered for the new strategies. Window 400 also includes button 413 enabling a user to cancel the selection of a new grouping and Save button 414 enabling a user to save the selected grouping.

Figure 5:
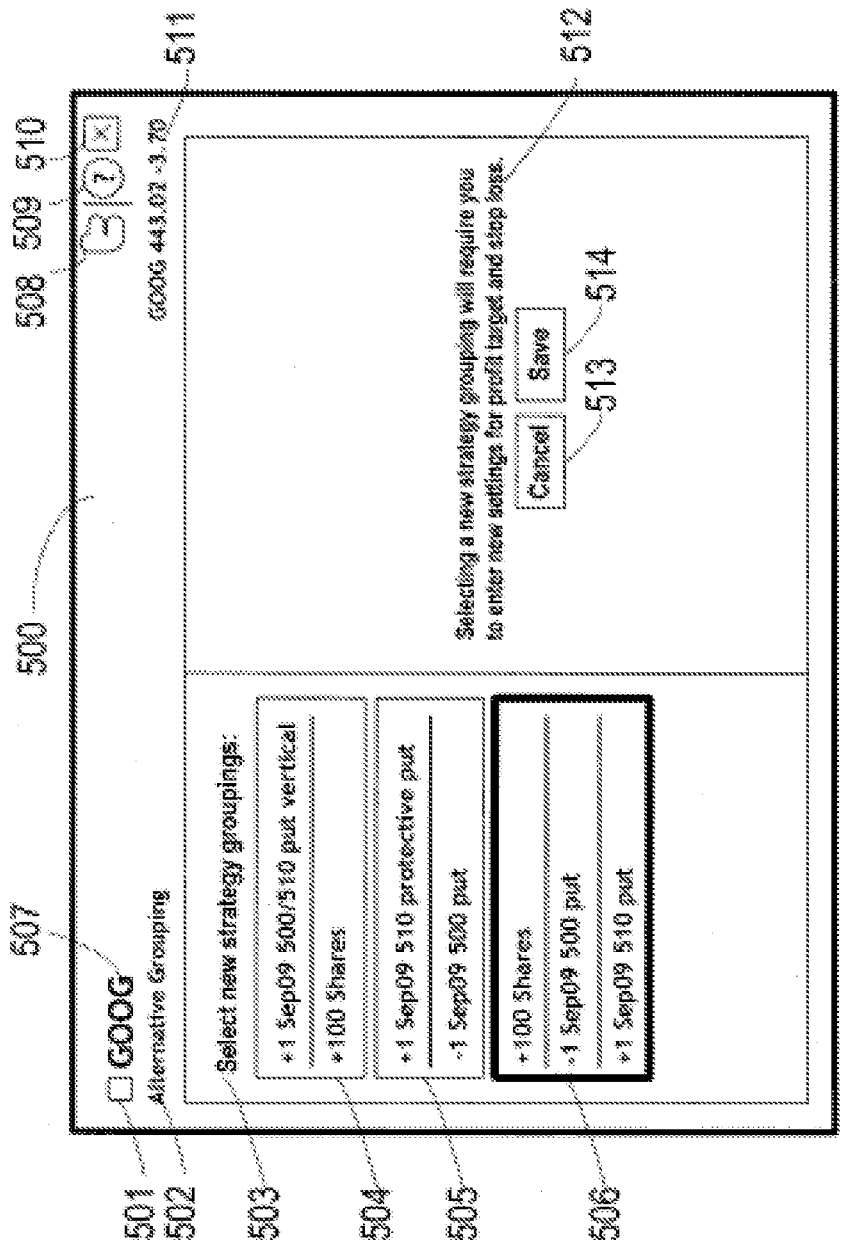
FIG. 5 is a screen shot illustrating an embodiment of the Alternative Grouping window with an Alternative Grouping selected.

FIG. 5 is a diagram illustrating an embodiment of a window displaying alternative groupings with a grouping selected. In the example shown, the state of window 500 is shown after the grouping 506 has been selected. A prior selected grouping (e.g., grouping 504) is no longer highlighted (e.g., as is shown in FIG. 4). Selected grouping 506 has three strategies: shares, a long put and a short put. Icon 501 is an icon that indicates using a color gradient whether the GOOG underlying is up or down on the day (e.g., different colors and intensities of colors used for indicating price movement). Window 500 includes title 502 indicating the title of window 500: "Alternative Grouping." Instruction 503 comprises displayed text in window 500 prompting the user to select a grouping from the available choices.

Window 500 also shows grouping 504—the vertical strategy and shares, grouping 505—the protective put strategy and short put, and grouping 506—the individual positions which is the currently selected grouping. Symbol 507 comprises a symbol for the underlying, in this case the Google stock symbol GOOG. Button 508 enables a user to share information or comments about these groupings on the social networking site Twitter. Button 509 enables a user to access help for the Alternative Grouping window. Button 510 enables a user to close the window. Window 500 includes mark price of Google stock 511 (symbol GOOG) and how much it is up or down on the day and warning statement 512 alerting the user if a new strategy grouping is selected that Exit Plans will need to be re-entered for the new strategies. Button 513 enables a user to cancel the selection of a new grouping, and Save button 514 enabling a user to save the selected grouping.

Figure 6A:
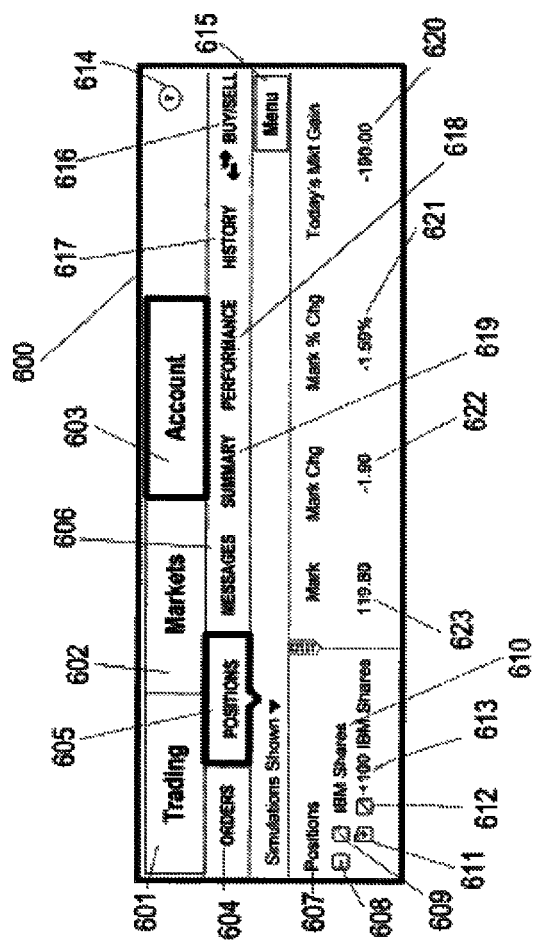
FIG. 6A is a diagram illustrating an embodiment of a window for an automated strategy grouping system.
Figure 7:
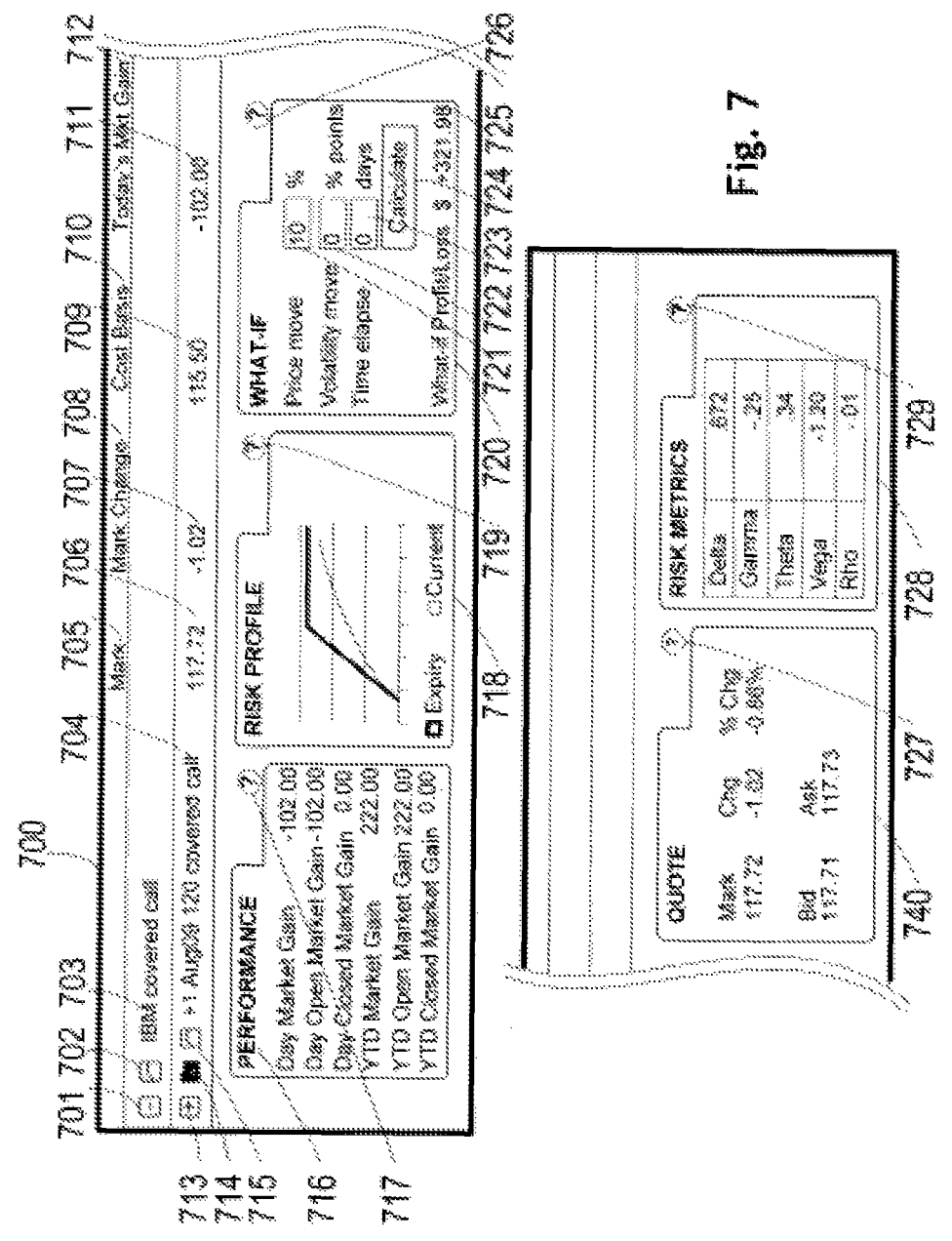

FIG. 6A is a diagram illustrating an embodiment of a window for an automated strategy grouping system. In the example shown, window 600 includes trading tab 601, markets tab 602, and account tab 603 (e.g., highlighted to indicate that the tab is selected). Account tab 603 includes orders sub-tab 604, position sub-tab 605 (e.g., highlighted to indicate that the tab is selected), messages sub-tab 606, summary sub-tab 619, performance sub-tab 618, history sub-tab 617, and buy/sell sub-tab 616. Label 607 comprises a text label for a Positions list. Button 608 enables a user to reveal the holdings for the IBM underlying. Icon 609 comprises an icon indicating a risk profile and position indicator for how the held instruments for the IBM underlying are performing (e.g., a color, hue, gray-scale, or other visual indicator). One instrument, IBM shares, is shown being held in window 600. Text 610 comprises a description of the held position for the underlying. Button 611 enables a user to reveal thumbnail component data for the position (e.g., as is shown in FIG. 7). Icon 612 comprises an icon indicating a risk profile and position indicator for how the IBM Shares are performing. Text 613 comprises a description of the IBM Shares position. Button 614 enables a user to access the Help system for the trading application.

Window 600 also includes Today's Market Gain 620 of the IBM shares position, Mark percentage (%) Change 621 of the IBM Shares position, Mark Change 622 of the IBM Shares position, And Mark price 623 of the IBM Shares position.

Figure 6B:
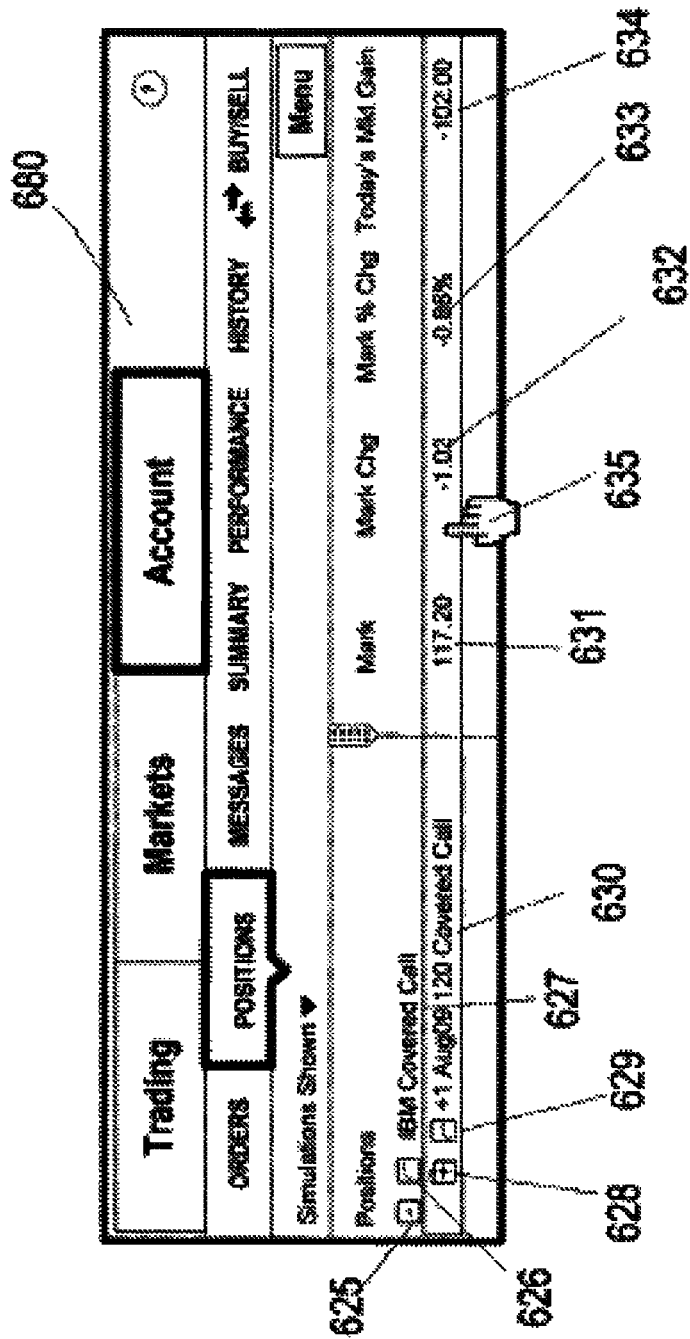
FIG. 6B is a diagram illustrating an embodiment of a window for a system for automated strategy grouping.

FIG. 6B is a diagram illustrating an embodiment of a window for a system for automated strategy grouping. In some embodiments, window 680 of FIG. 6B represents a window that displays the result of the placing of an order to sell an IBM call option, the filling of the order, and the subsequent triggering of an automated strategy grouping system. In the example shown, the result of Automated Strategy Grouping is the combining of the held long IBM shares and the newly sold call into one strategy, a covered call. Button 625 enables a user to reveal the held strategies for the IBM underlying. Icon 626 comprises an icon indicating the risk profile and colored profit and loss indicator for the aggregate of strategies held for the IBM underlying (e.g., one held strategy, the "covered call"). Text 627 indicates a held strategy for the IBM underlying; in this case there is only one strategy which is the covered call.

Window 680 includes button 628 enabling a user to reveal thumbnail component data for the covered call strategy (e.g., as is shown in FIG. 7). Icon 629 comprises an icon indicating the risk profile and colored profit and loss indicator for the covered call strategy that illustrates with a color gradient how the covered call position is performing during the current trading day. Text 630 comprises a description for the covered call position. The "+1" indicates long one unit of the covered call, the "Aug09" indicates the expiration of the strategy, the "120" indicates the strike price of the strategy and the "covered call" indicates the type of strategy.

Window 680 also includes Mark price 631 of the strategy, Mark Change 632 of the strategy (e.g., the amount the price of one unit of the strategy has moved during the current trading day), Mark % Change 633 of the strategy, and Today's Market Gain 634 of the strategy. Cursor 635 indicates a user's selection by clicking on the strategy and invoking an Action Menu.

Figure 6C:
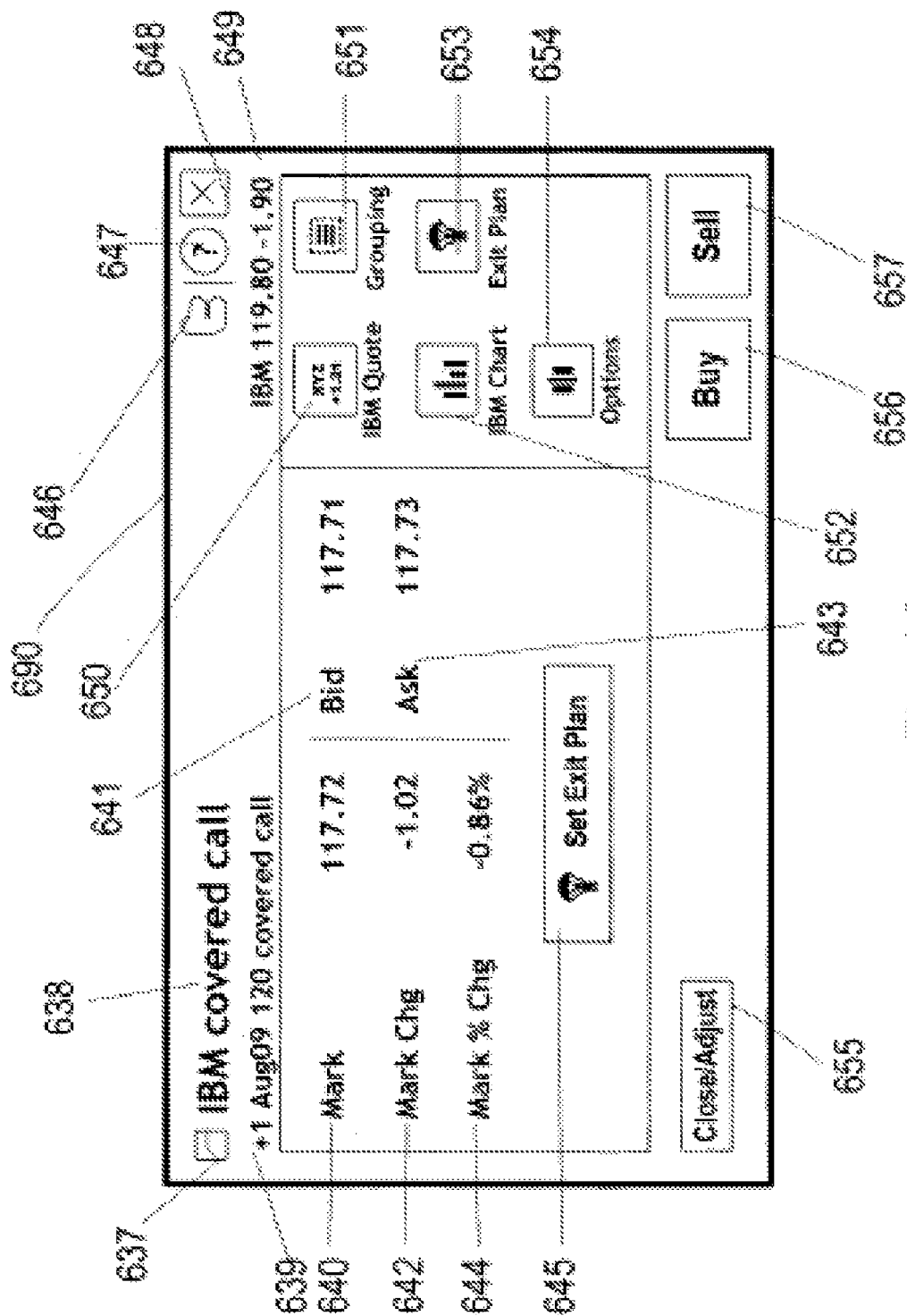
FIG. 6C is a diagram illustrating an embodiment of a window for an automated strategy grouping system.

FIG. 6C is a diagram illustrating an embodiment of a window for an automated strategy grouping system. In some embodiments, window 690 appears after the user has clicked on the strategy (e.g., where cursor 635 in FIG. 6B is located). In the example shown, Icon 637 is an icon indicating the risk profile and colored profit and loss indicator for the covered call strategy that illustrates with a color gradient how the covered call position is performing during the current trading day. Window 690 includes strategy name 638, and description 639 for the covered call position. The "+1" indicates long one unit of the covered call, the "Aug09" indicates the expiration of the strategy, the "120" indicates the strike price of the strategy and the "covered call" indicates the type of strategy. Marker 640 indicates the Mark price of the strategy. Window 690 also includes Bid price 641 of the strategy, Mark Change 642 of the strategy, Ask price 643 of the strategy, and Mark % Change 644 of the strategy. Button 645 enables a user to set an exit plan for the strategy. Button 646 enables a user to share information or comments about this strategy via the social networking site Twitter. Button 647 enables a user to access help for this Action Menu. Button 648 enables a user to close the window. Window 690 includes quote 649 for the IBM underlying. Button 650 enables a user to get quote information on the IBM underlying. Button 651 enables a user to invoke an automated strategy grouping system to find alternative groupings for positions held for the IBM underlying. Button 652 enables a user (e.g., by clicking, double clicking, or otherwise selecting the button) to get a chart of the IBM underlying. Button 653 enables a user to set an Exit Plan for the covered call strategy. Button 654 to obtain an option chain for the IBM underlying. Button 655 to close the covered call strategy or to adjust the strategy. Adjusting a strategy involves invoking a trade that changes the characteristics of the strategy such as expiration or strike price. Button 656 enables a user to Buy the strategy. Button 657 enables a user to Sell the strategy.

FIG. 7 is a diagram illustrating an embodiment of a window providing metrics and data available at the strategy level for the strategies created by Automated Strategy Grouping. In the example shown, button 701 enables a user to reveal data for the held positions for the IBM underlying. Icon 702 is an icon indicating a risk profile and indicator of how the held positions for the IBM underlying are performing during the current trading day. Window 700 includes an identification of the positions held for the IBM underlying—for example, only one strategy, a covered call, is held. Description 704. The "+1" indicates being long one unit of the strategy, the "Aug09" is the expiration of the strategy, the "120" is the strike price of the strategy, the "covered call" is the name of the strategy.

Window 700 includes column label 705 for the Mark price, value of the Mark price 706 of the covered call strategy, value of the Mark Change 707 for the strategy, column label 708 for the Mark Change, value of the Cost Basis 709 of the strategy, column label 710 for the Cost Basis, value of the Today's Market Gain 711 for the strategy, and column label 712 for Today's Market Gain. Window 700 also includes button 713 that enables a user to view the component instruments in the covered call strategy and button 714 that enables a user to reveal the various components of "thumbnail" data and functionality for the strategy. The components include but are not limited to Performance, Risk Profile, What-if, Quote and Risk Metrics. Icon 715 is an icon indicating a risk profile and indicator of how the strategy is performing during the current trading day. Performance thumbnail data component 716 for the strategy. Button 717 enables a user to access help for the Performance thumbnail data component. Risk Profile thumbnail data component 718 for the strategy. Button 719 enables a user to access help for the Risk Profile thumbnail data component. What-if thumbnail data component 720 for the strategy. Input 721 indicates a field where the user can enter a price move to determine how the strategy would be impacted. Input 722 indicates a field where the user can enter a volatility move to determine how the strategy would be impacted. Input 723 indicates a field where the user can enter a number of days of time elapse to determine how the strategy would be impacted. Button 724 enables a user to calculate the impact on the strategy of data entered in the price move, volatility move and time elapsed fields. Profit and loss value from the entered data 725 is displayed on the screen after the Calculate button is pressed. Button 726 enables a user to access help for the What-if thumbnail data component. Window 700 includes Quote thumbnail data component 740 for the strategy and button 727 enables a user to access help for the Quote thumbnail data component. Window 700 includes Risk Metrics thumbnail data component 728 for the strategy. Marker 729 indicates a button to access help for the Risk Metrics thumbnail data component.

Figure 8:
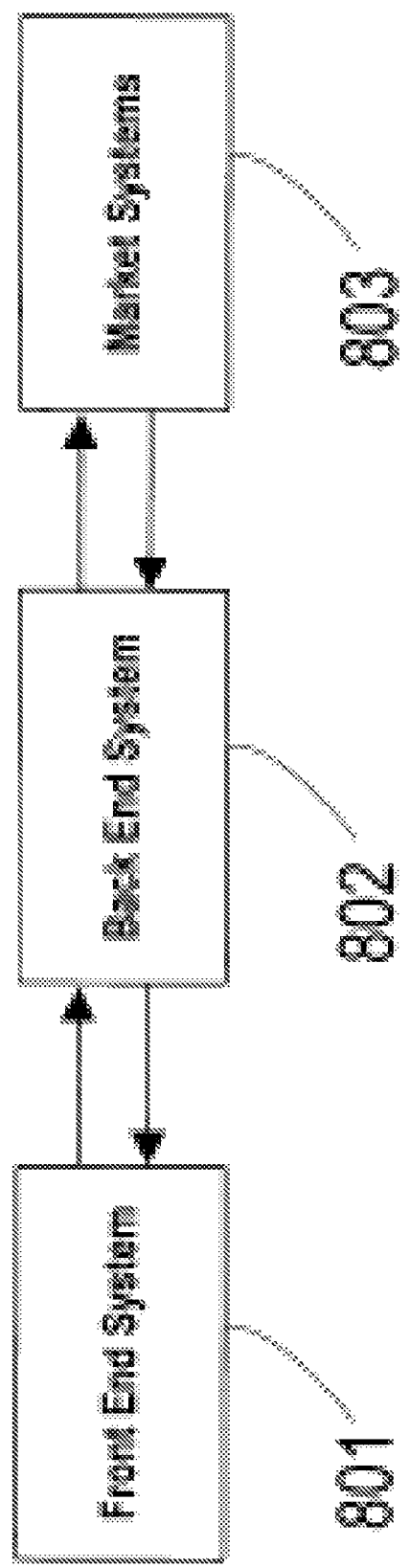
FIG. 8 is a diagram illustrating an embodiment of a trading system.

FIG. 8 is a diagram illustrating an embodiment of a trading system. In the example shown, front end system 801 includes but is not limited to a user interface and components that support user interaction. Back end system 802 includes but is not limited to mechanisms for storage and retrieval of user and account data as well as systems for storing historical market data and performing analytic calculations. Market systems 803 include but are not limited to quote systems and order execution systems. In various embodiments, front end system 801, back end system 802, market systems 803 each comprise a server, a computer system, a single processor system, a multiprocessor system, one or more physical systems, a portion of a single system, a virtual system, a system including a memory and processor, or any other appropriate computer hardware and/or software. In various embodiments, a user accesses the system using a computer system, a mobile system, a network attached system, a wireless attached system, a cell phone attached system or device, a browser, or any other appropriate hardware and/or software for accessing the trading system.

Figure 9:
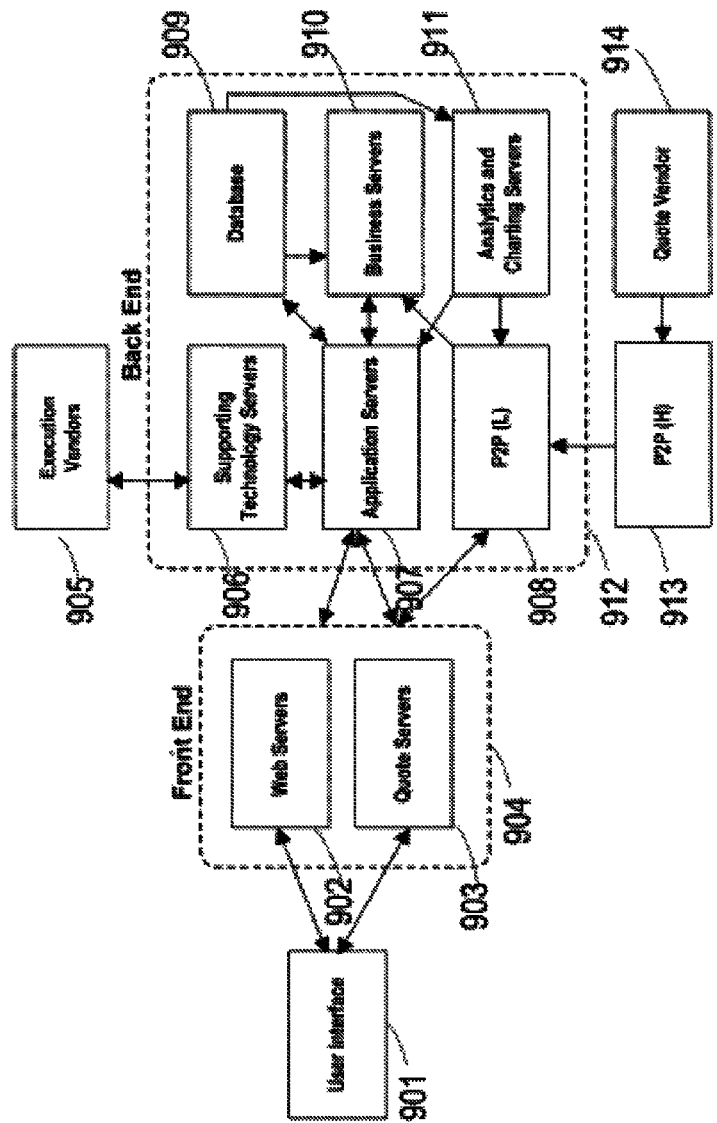
FIG. 9 is a diagram illustrating an embodiment of the high level components of a trading system

FIG. 9 is a flow diagram illustrating an embodiment of a trading system. In the example shown, trading system includes user interface 901, front end 904, and back end 912. Front end 904 includes web servers 902 and quote servers 903. Quote servers 903 stream market data to the user interface. Execution Vendors 905 fill orders in the market from users as relayed via front end 904 and back end 912. Back end 912 includes Supporting Technology Servers 906; Application Servers 907, which provide application functions and services; P2P (L) 908, a peer to peer market data source; Database 909, which stores all user data including but not limited to positions, orders, strategy groupings, exit plans and balances; Business Servers 910; Analytics and Charting Servers 911, whose functions include providing risk metrics for positions and price charts; P2P(H) 913 comprises a market data source. Quote Vendor 914 is the source for market price quotes.

Figure 10:
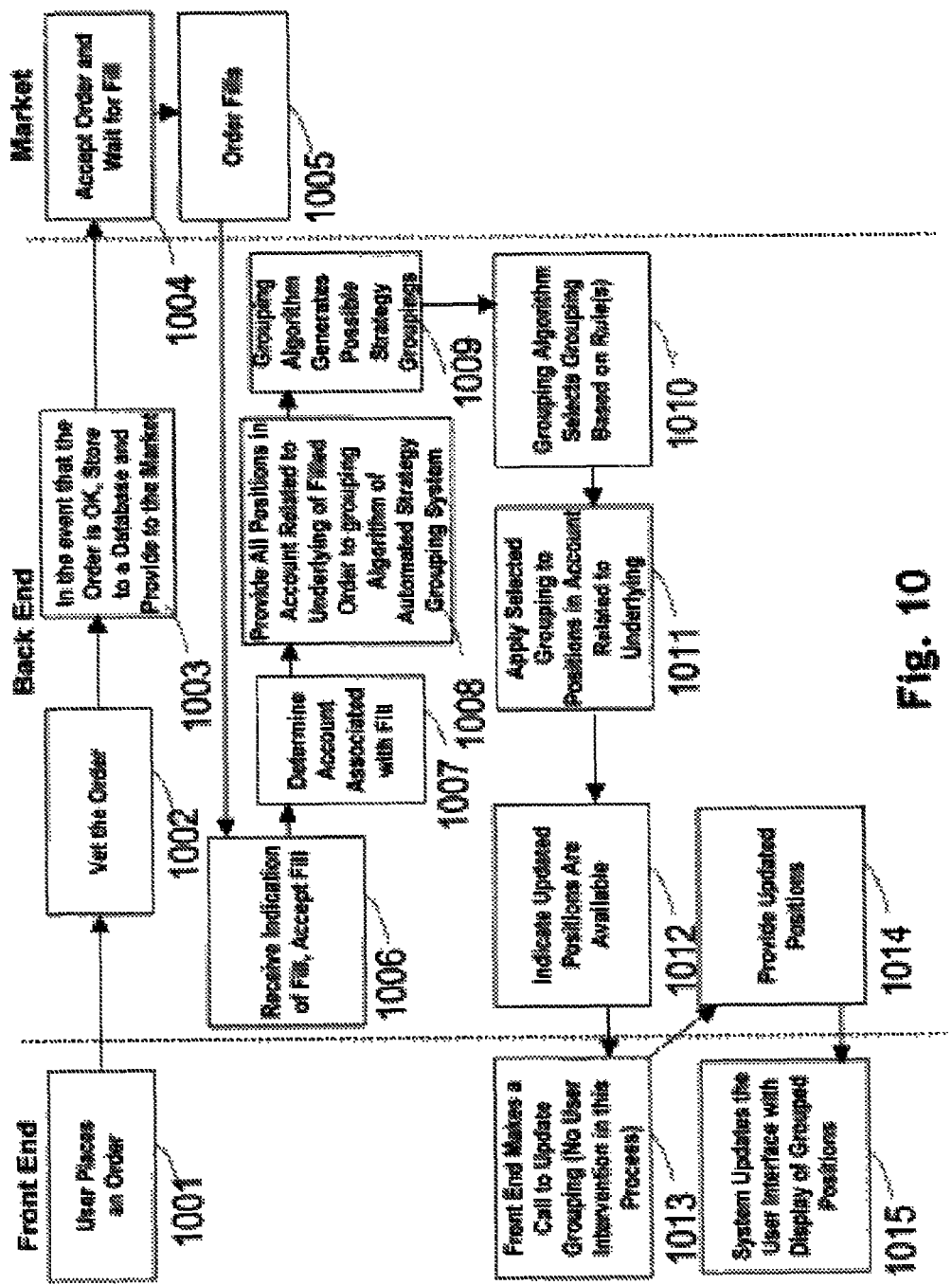
FIG. 10 is a flow diagram illustrating an embodiment of a process for automated strategy grouping.

FIG. 10 is a flow diagram illustrating an embodiment of a process for automated strategy grouping. In the example shown, in 1001 a user places an order. In 1002, the order is vetted. For example, vetting the order comprises checking that the order is a valid order and that the order is acceptable within a user's account constraints and available funds for the user. In 1003, in the event that the order is OK, store the order to a database and provide the order to the market. In some embodiments, the order is stored to a storage system that is not a database. In 1004, the order is accepted, and the order waits for a fill. In 1005, the order is filled. In 1006, an indication of fill is received, and the fill is accepted. For example, acceptance of the fill includes storing the fill in the database or storage system. In 1007, an account associated with the fill is determined. In 1008, provide all positions in the account associated with the underlying investment instrument of filled order to automated strategy grouping system. For example, the existing positions the user is holding are gathered from the database or storage system for the underlying and provided to the grouping algorithm of an automated strategy grouping system. In 1009, the grouping algorithm generates the possible strategy groupings. In 1010, the grouping algorithm selects grouping based on rule(s). In 1011, selected grouping is applied to positions in account related to the underlying. In some embodiments, the positions in account are stored in the back end system. In 1012, it is indicated that updated positions are available. In some embodiments, the front end is provided an indication that updated positions are available so that the front end can initiate an update process for its position display. In 1013, front end makes a call to update positions (no user intervention in this process). In some embodiments, the front end updates its display of positions and/or groupings automatically after receiving an indication that update positions/groupings are available. In 1014, updated positions are provided. In some embodiments, the updated positions and/or groupings are sent from the back end to the front end. In 1015, the system updates the user interface with a display of the grouped positions.

Figure 11:
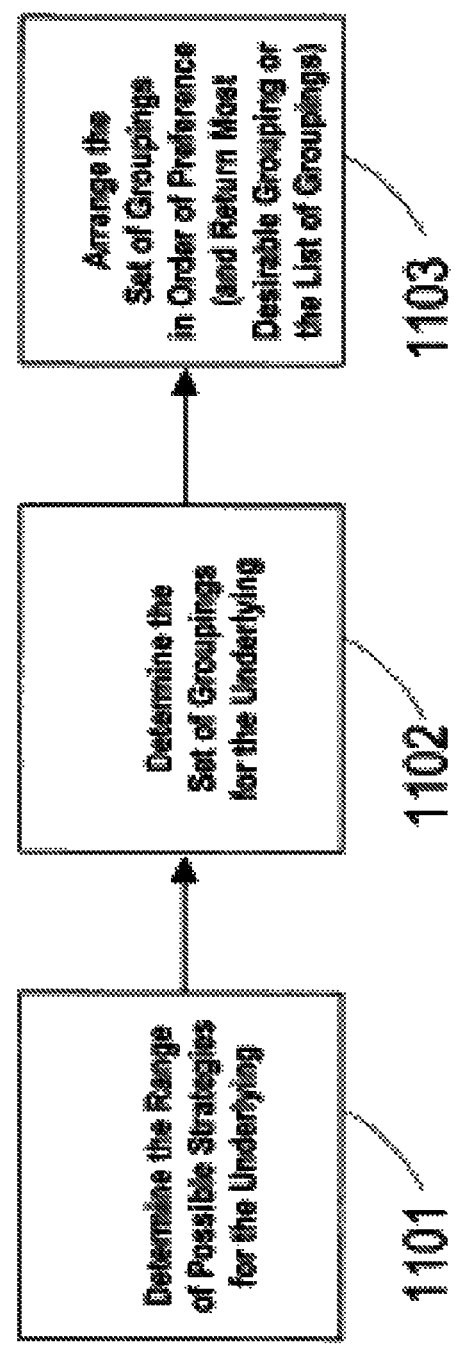
FIG. 11 is a flow diagram illustrating an embodiment of the process for automatically finding groups of strategies and selecting a desired strategy.

FIG. 11 is a flow diagram illustrating an embodiment of the process for automatically finding groups of strategies and selecting a desired strategy. In the example shown, in 1101 the range of strategies that are possible are determined given the held instruments for the underlying. In some embodiments, a set of possible strategies are determined based, at least in part, on a set of investment instruments that are held within an account or associated with a user. In 1102, the set of groupings is determined for the underlying. In some embodiments, a set of groupings of strategies is determined from the set of possible strategies. In some embodiments, the set of grouping of strategies comprises all possible combination of groupings. In 1103, the set of groupings is arranged in order of desirability and a most desired grouping or the ordered list of groupings is returned. In some embodiments, one or more selected groupings from the set of groupings of strategies is determined based at least in part on a selection criteria. In some embodiments, based at least in part on a rule (e.g., a strategy grouping with the fewest possible members, a strategy grouping with members that have strategies of only certain predetermined types, etc.), a strategy grouping is selected.

Figure 12:
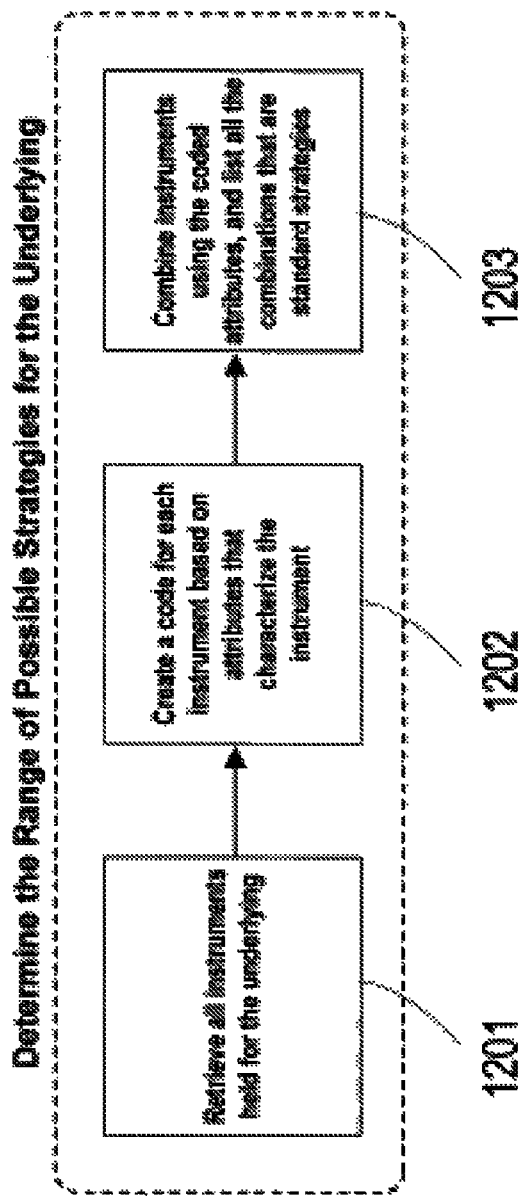
FIG. 12 is a flow diagram illustrating an embodiment of a process for determining possible strategies from a set of instruments for an underlying.

FIG. 12 is a flow diagram illustrating an embodiment of a process for determining possible strategies from a set of instruments for an underlying. In some embodiments, the process of FIG. 12 is used to implement 1101 of FIG. 11. In the example shown, in 1201 all the instruments held for an underlying are retrieved. In some embodiments, positions and/or groupings of instruments associated with an underlying investment and associated with an account or user are retrieved from the database storage system (e.g., a storage system associated with the back end system). In 1202, a code is created for each instrument based on attributes that characterize the instrument. In some embodiments, the attributes that characterize each instrument are encoded using a representation that enables a unique representation for an instrument. In 1203, instruments are combined using the coded attributes, and all the combinations that are standard strategies are listed. For example, standard strategies include but are not limited to call options, put options, underlying instruments such as stock or an exchange traded fund (ETF), covered calls, protective puts, verticals, straddles, strangles, calendars, diagonals, butterflies, condors, iron condors, iron butterflies, backspreads, combinations, synthetic stock, collars and vertical spread spreads.

Figure 13:
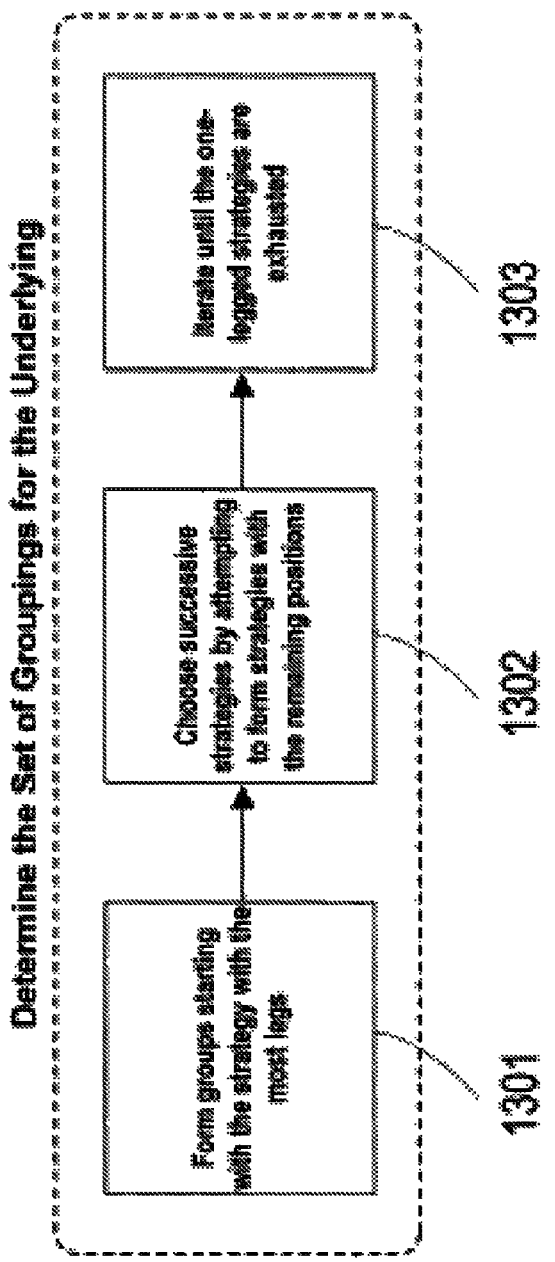
FIG. 13 is a flow diagram illustrating an embodiment of a process for determining the set of possible groupings from a set of possible strategies for an underlying.

FIG. 13 is a flow diagram illustrating an embodiment of a process for determining the set of possible groupings from a set of possible strategies for an underlying. In some embodiments, the process of FIG. 13 is used to implement 1102 of FIG. 11. In the example shown, in 1301 groups starting with the strategy with the most legs are formed. In 1302, successive strategies are chosen by attempting to form strategies with the remaining positions. In 1303, iterate until the one-legged strategies are exhausted.

Figure 14:
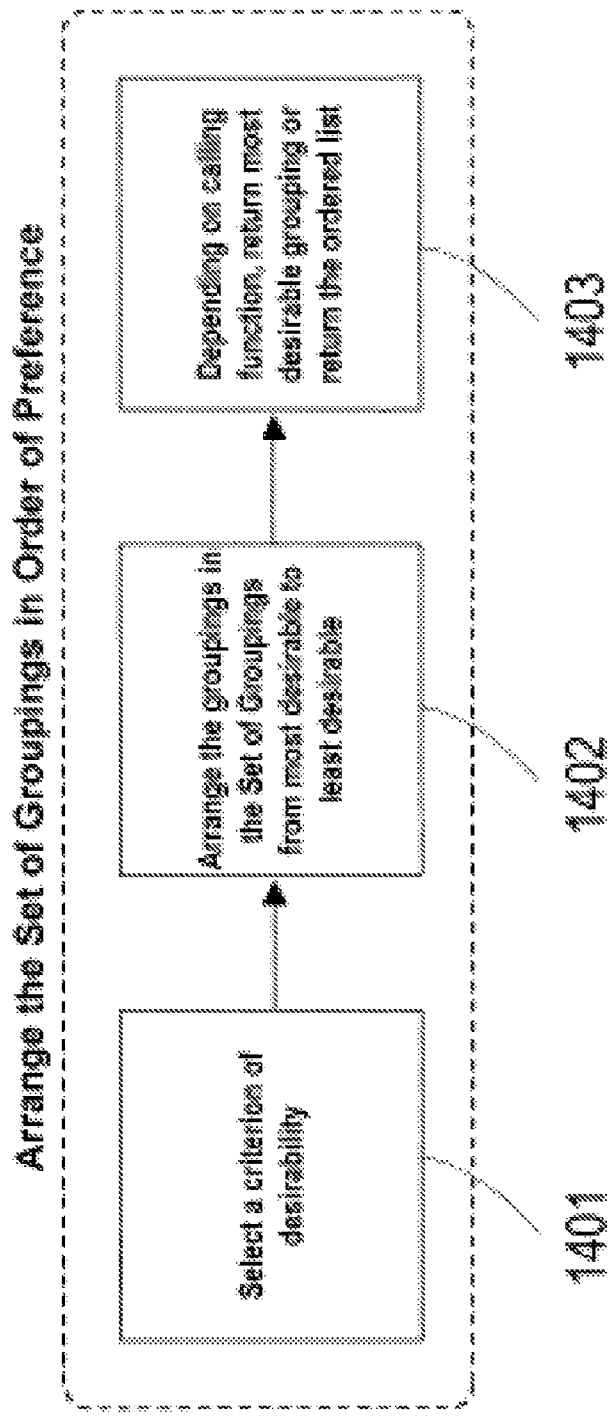
FIG. 14 is a flow diagram illustrating an embodiment of a process for arranging the set of possible groupings for an underlying in an order of desirability according to a criterion.

FIG. 14 is a flow diagram illustrating an embodiment of a process for arranging the set of possible groupings for an underlying in an order of desirability according to a criterion. In some embodiments, the process of FIG. 14 is used to implement 1103 of FIG. 11. In the example shown, in 1401 a criterion of desirability is selected. In some embodiments, the criterion of desirability comprises a default criterion (e.g., a strategy group with the least number of elements in the group). In various embodiments, criteria of desirability comprise, but are not limited to, finding the grouping with the least number of strategies, finding groupings that limit the number of instruments that are in any of the strategies in the group and finding groupings that only allow one specific multi-instrument strategy plus the one-instrument strategies, or any other appropriate criteria. In 1402, the set of groupings is arranged in order according to the desirability criterion from most desirable to least desirable. In 1403, the most desirable grouping or the ordered list of groupings is returned depending on the calling function's request.

In various embodiments, the desirability criteria or prioritization or ranking of the criteria is selected by a user. For example, a user provides an ordered ranking or prioritized rule(s) indicating the desirability of strategies.

In some embodiments, the automatic strategy grouping algorithm comprises the algorithm described below. In some embodiments, the portfolio is arranged by underlying security and the holdings related to one underlying are organized at a time.

Start of automatic strategy grouping algorithm:
The system specifies via a call to the algorithm whether the algorithm should return one preferred grouping of strategies or a list of the most preferred groupings. A list of the most preferred groupings is used in some embodiments for enabling a user to select a user preferred grouping. If a list is requested, one member of the list will always be the grouping that is comprised of each individual instrument as a member of the group.
1) Determine the Range of Possible Strategies for the Underlying
For the selected underlying, determine the possible standard strategies that can be made from the individual instruments (legs) held for this underlying. Individual instruments include, but are not limited to, any of the following six items:
   1. Long underlying
   2. Long call
   3. Long put
   4. Short underlying 5. Short call
6. Short put Possible Strategies. The Range of Possible Strategies is a subset of the working set of standard strategies. The working set of strategies includes individual leg strategies, such as a long call, and multi-leg strategies such as a vertical strategy which contains both a long and a short call. The working set of strategies is variable, but generally conforms to strategies that are currently popular. Examples from the set of strategies include vertical strategies, diagonal strategies, butterflies, condors, straddles, strangles, iron condors, collars, buy-writes, etc.

The Range of Possible Strategies are determined based on a set of standard strategies using the following technique:

A. A strategy has four attributes which will uniquely define a standard strategy strategy a unique representation is generated and expressed in the form of a Code. The four attributes are:
   a. The number of positions in the strategy (number of legs). For example, for a long vertical call strategy the number of legs is 2.
   b. The type and side of each position in the strategy. Possible types would include, but not be limited to, calls, puts, stock and exchange traded funds (ETF's). Possible sides would include being Long or being Short. Thus, a long vertical call strategy would have a type/side attribute that can be expressed as LCSC, or Long Call Short Call.
   c. The relationship of the strike prices in the positions. For a long vertical call strategy, the strike of the long call is less than the strike of the short call, or LC(strike)<SC(strike)
   d. The relationship of the expiration dates in the positions. For a long vertical call strategy the expirations are the same, or LC(expiry)=SC(expiry)

B. This Code is unique for all the standard strategies and is used as an Identifier for the standard strategy. For example, for a long vertical call strategy the code comprises 2LCSC<=, to mean a 2 legged strategy comprising a long call and a short call where the strike of the long call is less than the strike of the short call and the expiration dates are the same.

C. The basic steps in identifying the attributes comprises:
   a. Identify the number of positions involved in the strategy.
   b. Take positions one by one and identify the attributes of type and side
   c. Based on number of components/positions, comparison on strike price and expiration needs to be performed.
   d. Find the relationship between the strikes
   e. Find the relationship between the expirations D. To determine the Range of Possible Strategies, iterate through the set of instruments held for the underlying by combining the instruments into possible strategies and testing to see if they are standard strategies. Any 1 instrument taken by itself is always a standard strategy and a member of the Range of Possible Strategies.

2) Determine the Set of Groupings for the Underlying

For the Range of Possible Strategies, determine all possible groupings of strategies that are combined to exactly make up the holdings for the underlying. Call this set of groupings the Set of Groupings.

The Set of Groupings is determined as follows:

A. Start with the standard strategy in the Range of Possible Strategies that has the most legs. Form groups such that group members are standard strategies. Successive strategies for the group are chosen by attempting to form strategies with the remaining positions that are members of the Range of Possible Strategies that have the most legs. As the greater number of leg possibilities are eliminated, the lesser number of leg strategies are used down to the one-legged choices. Iterate the process by starting with the next-most complex strategy in the Range of Possible Strategies.

B. For making strategies, it's required that every held position be a member of a strategy. There are no left over positions of a held instrument (e.g., no positions that are not represented in a grouping).

3) Arrange the Set of Groupings in Order of Preference

Select a criterion of desirability of a grouping and arrange the Set of Groupings into priority order from most desirable to least desirable. Then, return either the most desirable grouping (for automated grouping functions) or the list of the top groupings in priority order for functions where the user can pick the desired group. Do this as follows:

A. Choose a criterion for what makes the most desirable set of groupings. Various criteria include, but are not limited to, finding the grouping with the least number of strategies, finding groupings that limit the number of instruments that can be in any of the strategies in the group and finding groupings that only allow one specific multi-instrument strategy plus the one-instrument strategies.

B. Arrange the groupings in the Set of Groupings in order from the most desirable groupings to the least desirable groupings.

C. Depending on the calling function, return the most desirable grouping or a list of most desirable groupings (a list would be returned, for example, for scenarios when the user is hand pick a grouping). If a list is requested, the list always includes the grouping that is comprised of each individual instrument as a member of the group.

End:

Although the foregoing embodiments have been described in some detail for purposes of clarity of understanding, the invention is not limited to the details provided. There are many alternative ways of implementing the invention. The disclosed embodiments are illustrative and not restrictive.

I claim:

1. A system for trading, comprising:

a computer having a processor and a memory, the processor configured to:

receive an indication to automatically group a set of individual investment instruments held by a user, each of the set of individual investment instrument having a quantity of units associated therewith;

determine a set of possible strategies, each possible strategy comprising one or more units of the quantity of units of one or more of the set of individual investment instruments held by the user;

determine a set of groupings of strategies from the set of possible strategies, each grouping comprising a non-overlapping combination of strategies of the set of possible strategies which together include all units of the quantities of units of all of the set of individual investment instruments held by the user; and determine one or more selected groupings from the set of groupings of strategies based at least in part on a selection criteria; and a memory coupled to the processor and configured to provide the processor instructions.

2. A system as in claim 1, wherein each of the set of individual investment instruments is related to a particular underlying investment instrument.

3. A system as in claim 1, wherein each of the set of individual investment instruments comprise one of an option contract on a quantity of an underlying instrument, a quantity of shares of a stock, a quantity of shares of a mutual fund, a quantity of shares of an exchange traded fund, a quantity of shares of an index, a quantity of a currency, or a quantity of an asset.

4. A system as in claim 1, wherein each of the set of possible strategies comprise one of a spread, a butterfly, a condor, a vertical, a diagonal, a straddle, a strangle, an iron condor, a collar, a buy-write, a short position, or a long position.

5. A system as in claim 1, wherein the indication is triggered in the event that an order has been filled in a market.

6. A system as in claim 1, wherein the selected grouping is identified as a particular strategy.

7. A system as in claim 1, further comprising:
providing a set of known strategies; and
wherein the set of possible strategies is determined by comparison of each of the set of known strategies with each of the set of individual investment instruments held by the user.

8. A system as in claim 7, wherein each of the set of known strategies is characterized by a set of attributes unique to the particular known strategy, the comparison of each of the known strategies further comprising comparing each set of attributes with attributes of each of the set of individual investment instruments held by the user.

9. A system as in claim 8, wherein the set of attributes includes number of positions, type of each position, side of each position, interrelationship of positions, and interrelationship of expiration dates of positions.

10. A system as in claim 1, wherein the processor is further configured to perform an operation on the selected grouping as if the selected grouping were a single investment instrument.

11. A system as in claim 10, wherein the operation comprises receiving a quote on the selected grouping.

12. A system as in claim 10, wherein the operation comprises trading the selected grouping.

13. A system as in claim 10, wherein the operation comprises viewing risk metrics on the selected grouping.

14. A system as in claim 10, wherein the operation comprises viewing profiles on the selected grouping.

15. A system as in claim 1, wherein the selection criteria comprises one or more user selection criteria.

16. A system as in claim 1, wherein the selection criteria comprises a user selection of a grouping from the set of groupings of strategies.

17. A system as in claim 1, wherein the selection criteria comprises finding a grouping having the least number of strategies.

18. A system as in claim 1, wherein the selection criteria comprises finding one or more groupings that have a limit to a number of instruments in any of the grouped strategies.

19. A system as in claim 1, wherein the selection criteria comprises finding one or more groupings that only include one multi-instrument strategy plus one or more one-instrument strategies.

20. A method of trading, comprising:
receiving an indication to automatically group a set of individual investment instruments held by a user, each of the set of individual investment instrument having a quantity of units associated therewith;
determining, using a computer with a processor and a memory, a set of possible strategies, each possible strategy comprising one or more units of the quantity of units of one or more of the set of individual investment instruments held by the user;
determining a set of groupings of strategies from the set of possible strategies, each grouping comprising a non-overlapping combination of strategies of the set of possible strategies which together include all units of the quantities of units of all of the set of individual investment instruments held by the user; and
determining one or more selected groupings from the set of groupings of strategies based at least in part on a selection criteria.

21. A non-transitory computer readable storage medium and comprising computer instructions for:
receiving an indication to automatically group a set of individual investment instruments held by a user, each of the set of individual investment instrument having a quantity of units associated therewith;
determining a set of possible strategies, each possible strategy comprising one or more units of the quantity of units of one or more of the set of individual investment instruments held by the user;
determining a set of groupings of strategies from the set of possible strategies, each grouping comprising a non-overlapping combination of strategies of the set of possible strategies which together include all units of the quantities of units of all of the set of individual investment instruments held by the user; and
determining one or more selected groupings from the set of groupings of strategies based at least in part on a selection criteria.

* * * * *